United States Patent [19]

Lewis

[11] Patent Number: 5,173,727
[45] Date of Patent: Dec. 22, 1992

[54] ZOOM VIEWFINDER

[76] Inventor: Alan E. Lewis, Eastman Kodak Company, Rochester, N.Y. 14653-5225

[21] Appl. No.: 783,588

[22] Filed: Oct. 28, 1991

[51] Int. Cl.$^5$ .............................................. G03B 13/10
[52] U.S. Cl. .................................... 354/222; 359/644
[58] Field of Search .............. 354/219, 222, 195.1, 354/195.12, 199; 359/781, 686, 676, 643, 644

[56] References Cited

U.S. PATENT DOCUMENTS 4,725,130  2/1988  Ozawa ................................. 359/643
4,854,680  8/1989  Kikuchi ............................... 359/643
4,906,078  3/1990  Inabata et al. ...................... 359/644

Primary Examiner—Michael L. Gellner
Assistant Examiner—David M. Gray
Attorney, Agent, or Firm—Svetlana Z. Short

[57] ABSTRACT

A compact Galilean-type zoom finder suitable for compact cameras, and the like whose zoom ratio is about 2. The zoom finder is comprised of four units having negative, negative, positive and negative refractive powers in order from an object side. The first and the fourth lens units are fixed and the second and the third lens units are moved to perform zooming.

11 Claims, 1 Drawing Sheet

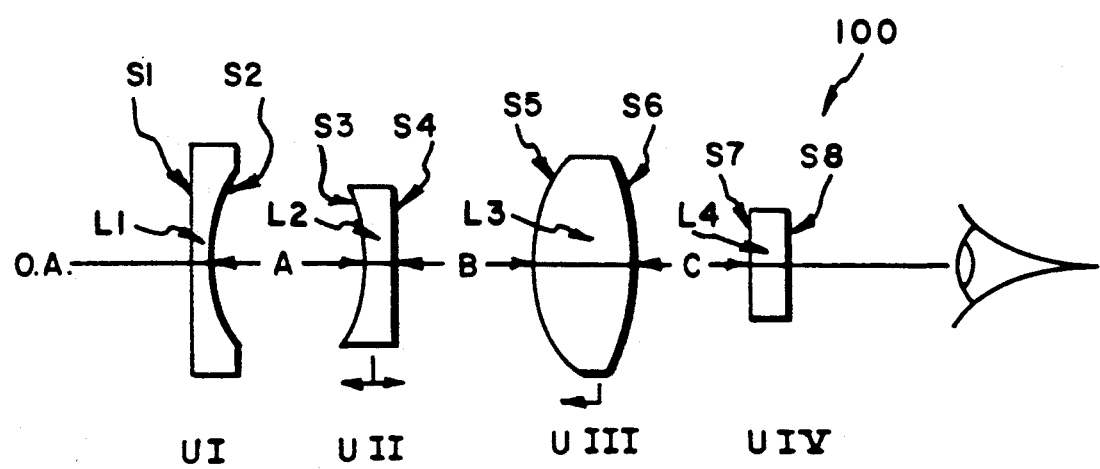

ZOOM VIEWFINDER

BACKGROUND OF THE INVENTION

1. Field of the Invention

This invention relates to zoom viewfinders having a zoom ratio of about 2.

2. Description of the Prior Art

U.S. Pat. Nos. 4,725,130 and 4,854,680 each describe a 3-unit Galilean-type zoom viewfinder. The finders disclosed in the above-mentioned patents all have a minus-plus-minus configuration. In these finders, the positive lens unit always moves for zooming, while the two negative lens units are stationary. U.S. Pat. No. 4,725,130 also discloses that the first negative lens unit may also move for zooming.

In the disclosed embodiments in both of these patents, the positive lens unit is disclosed to comprise two positive biconvex lens components located nearly in contact with each other. Although FIG. 5 of U.S. Pat. No. 4,854,680 shows that one of the components is a cemented doublet, this lens component itself is still positive and biconvex. The airspace between the two components of the positive lens unit is either fixed as shown in U.S. Pat. No. 4,725,130 or changes as shown in U.S. Pat. No. 4,854,680, but it is always held very small. That is, the lens components of the positive lens unit are nearly in contact with each other.

The inherent problem with this approach is that when the above minus-plus-minus component configuration is used and only the single positive unit is moved for zooming, the zoom finder suffers from defocusing, i.e. the image plane of focus of the lens moves. To accommodate this defocus, the lens of the observer's eye has to constantly adjust itself as the viewfinder zooms. Although, as disclosed in U.S. Pat. No. 4,725,130, the movement of the first lens unit in conjunction with the second lens unit can rectify this problem, a design modification such as this would loose an advantage of having fixed (i.e. stationary) outer lens elements.

SUMMARY OF THE INVENTION

It is therefore an object of the present invention to create a zoom finder (viewfinder) which has stationary outer elements in order to protect the (internal) zoom mechanism from dust and other contaminants.

It is another object of this invention to create a virtual image zoom finder having constant axial accommodation.

The above and other objects are achieved by a zoom finder comprising in order from an object side, a stationary first lens unit having negative refractive power, a movable second lens unit having negative refractive power, a movable third lens unit having positive refractive power and a stationary fourth lens unit having negative refractive, said second and said third units move for zooming.

BRIEF DESCRIPTION OF THE DRAWINGS

The accompanying figure is a side view of a zoom viewfinder that forms a preferred embodiment of the invention.

DETAILED DESCRIPTION OF THE PREFERRED EMBODIMENT

The lens system of the present invention has a general application to optical systems employing zoom viewfinders. An example of such application is a viewfinder suitable for use in compact cameras. In order to provide a concise description of the preferred embodiment, certain details of the viewfinder and camera in which it may be used are not described herein but are selectable from the prior art.

The lens system forming the viewfinder of the preferred embodiment of the present invention will now be described with reference being made to the accompanying figure. The lens system 100 is characterized by an unusually large half field angle (in a wide angle mode) of 33 degrees, 2× zoom range and compactness in both length and front (object side) aperture. The viewfinder has high image quality and low distortion. The outer elements of the zoom finder are fixed in position. This is helpfull for keeping dust and dirt out of the mechanism. The lens system 100 contains four optical units UI, UII, UIII and UIV with air spaces A, B and C between these units. Constant axial accomodation is achieved by use of two internal moving optical units UII and UIII.

Following from the object to pupil location the lens units are: A negative power lens unit UI, which is stationary (i.e. it does not move for zooming); a negative optical unit UII, movable along the optical axis for zooming; a positive optical unit UIII also movable along the optical axis for zooming; and a stationary negative power optical unit UIV. The function of the front, negative optical unit UI is to expand the beam diameter once it exits from a camera. Having the first optical unit UI and the second optical unit UII near each other allows coverage of the widest possible angle in a wide angle mode. This is done by virtue of bringing a negative unit UII from the back of the optical system towards the front of the optical system thus allowing more negative power towards the front in order to have extreme angle coverage. The positive power optical unit UIII is located towards the rear of the optical system in order to minimize the beam diameter. Finally, having a negative rear unit UIV, rather than it being positive, permits the positive unit UIII to be made stronger, so that the optical unit UIII does not have to travel as far to achieve full zooming. More specifically, the first lens unit UI comprises a negative lens element L1 with a stronger curvature oriented towards a pupil position; the second lens unit UII comprises a negative meniscus lens element L2 with a concave surface oriented toward to the first lens unit; the third lens unit UIII comprises a positive biconvex lens element L3; and the fourth lens unit UIV comprises a negative biconcave lens element L4. All of the lens elements were made of plastic to make the production of the viewfinder relatively inexpensive. The numerical data for the optical system 100 are as follows:

TABLE 1

| Surface | Clear Apertures Top-Bottom | Side-Side | Radius | Thickness | Material N | V |
|---|---|---|---|---|---|---|
| S1 | 7.76 | 12.30 | −463.009 | 1.500 | 492 | 574 |
| S2 | 6.77 | 10.28 | ASPHERE | A | | |
| S3 | 4.19 | 6.96 | −7.58810 | 1.700 | 535 | 405 |
| S4 | 4.58 | 7.82 | ASPHERE | B | | |
| S5 | 5.85 | 10.50 | 11.8290 | 4.670 | 492 | 574 |
| S6 | 5.67 | 10.25 | ASPHERE | C | | |
| S7 | 3.10 | 3.99 | −38.1935 | 1.200 | 535 | 405 |
| S8 | 3.00 | 3.61 | 44.2280 | | | |
| | | | FINDER LENGTH = 32.000 | | | |

ASPHERIC EQUATION:

TABLE 1-continued $$SAG = X = \frac{CY^2}{1 + \sqrt{1 - (k+1)C^2Y^2}} + DY^4 + EY^6 + FY^8 + GY^{10} + HY^{12}$$

| SURFACE S2 | C = .13752171 | F = .3713080E-06 |
|---|---|---|
| | k = −.95070186 | G = −.6640295E-08 |
| | D = −.7956792E-04 | H = .4424682E-10 |
| | E = −.9262375E-05 | |
| SURFACE S4 | C = −.02107171 | F = −.4358199E-06 |
| | k = −144.581545 | G = .8890752E-08 |
| | D = −.2195530E-03 | H = −.6878591E-10 |
| | E = .5259288E-05 | |
| SURFACE S6 | C = −.07742708 | F = −.1173125E-07 |
| | k = −4.31725012 | G = −.1292248E-09 |
| | D = .3499638E-04 | H = .1088147E-11 |
| | E = .2616992E-05 | |

| | AIR SPACE: | | |
|---|---|---|---|
| MAG. | A | B | C |
| .275 | 16.614 | 5.816 | .500 |
| .382 | 10.836 | 5.499 | 6.595 |
| .529 | 4.434 | 5.949 | 12.547 |

The space B between the optical units II and III in the above embodiment is about 17% of the total finder length. This appears to allow for superior performance for this type of lens system while maintaining the compactness of the overall system. The movement of UII and UIII relative to each other and to the stationary units UI and UIV provides a virtual image plane that is stationary and thus there is no need for the eye to adjust its focus as the finder is zooming. If the spacing B between units UII and UIII is kept constant, and the inner units move together at the same rate (for simplified mechanical considerations), the axial accomodation will vary with zoom position, but the image will still be viewable.

Although in the preferred embodiment each optical unit corresponds to a single lens element or lens component, in a modification one may split one of these lens components into two or more optical elements or components.

Finally, although each of the lens elements in the preferred embodiment were made of plastic, in a modification one may design the viewfinder with glass lens elements.

The invention has been described in detail with particular reference to a preferred embodiment thereof, but it will be understood that variations and modifications can be effected within the spirit and scope of the invention.

I claim

1. A zoom finder comprising in order from an object side, a stationary first lens unit having negative refractive power, a movable second lens unit having negative refractive power, a movable third lens unit having positive refractive power and a stationary fourth lens unit having negative refractive power, said second and third units being movable for zooming.

2. A zoom finder according to claim 1, wherein each lens element is made out of a plastic material.

3. A zoom finder according to claim 2, wherein the minimum space B between said second lens unit and said third lens unit is about 17% of the total length of said zoom finder.

4. A zoom finder according to claim 1 comprising the following design parameters

| | Clear Apertures | | | | Material | |
|---|---|---|---|---|---|---|
| Surface | Top-Bottom | Side-Side | Radius | Thickness | N | V |
| S1 | 7.76 | 12.30 | −463.009 | 1.500 | 492 | 574 |
| S2 | 6.77 | 10.28 | ASPHERE | A | | |
| S3 | 4.19 | 6.96 | −7.58810 | 1.700 | 535 | 405 |
| S4 | 4.58 | 7.82 | ASPHERE | B | | |
| S5 | 5.85 | 10.50 | 11.8290 | 4.670 | 492 | 574 |
| S6 | 5.67 | 10.25 | ASPHERE | C | | |
| S7 | 3.10 | 3.99 | −38.1935 | 1.200 | 535 | 405 |
| S8 | 3.00 | 3.61 | 44.2280 | | | |
| | | | FINDER LENGTH = 32.000 | | | |

ASPHERIC EQUATION:

$$SAG = X = \frac{CY^2}{1 + \sqrt{1 - (k+1)C^2Y^2}} + DY^4 + EY^6 + FY^8 + GY^{10} + HY^{12}$$

| SURFACE S2 | C = .13752171 | F = .3713080E-06 |
|---|---|---|
| | k = −.95070186 | G = −.6640295E-08 |
| | D = −.7956792E-04 | H = .4424682E-10 |
| | E = −.9262375E-05 | |
| SURFACE S4 | C = −.02107171 | F = −.4358199E-06 |
| | k = −144.581545 | G = .8890752E-08 |
| | D = −.2195530E-03 | H = −.6878591E-10 |
| | E = .5259288E-05 | |
| SURFACE S6 | C = −.07742708 | F = −.1173125E-07 |
| | k = −4.31725012 | G = −.1292248E-09 |
| | D = .3499638E-04 | H = .1088147E-11 |
| | E = .2616992E-05 | |

| | AIR SPACE: | | |
|---|---|---|---|
| MAG. | A | B | C |
| .275 | 16.614 | 5.816 | .500 |
| .382 | 10.836 | 5.499 | 6.595 |
| .529 | 4.434 | 5.949 | 12.547. |

5. A zoom finder comprising in order from an object side, a stationary first lens unit having negative refractive power, a movable second lens unit having negative refractive power, a movable third lens unit having positive refractive power and a stationary fourth lens unit having a negative refractive power, said second and said third units being moveable for zooming so that a space between said second lens unit and said third lens unit varies for zooming.

6. A zoom finder according to claim 5 wherein a space between said first and said second lens units and a space between said third and said fourth lens unit are varied during zooming.

7. A zoom finder according to claim 6 further having lens elements with aspherical surfaces.

8. A zoom finder according to claim 7 wherein:
said first lens unit comprises a negative lens element with a stronger curvature oriented towards a pupil position;
said second lens unit comprises a negative meniscus lens element with a concave surface oriented toward the first lens unit;
said third lens unit comprises a positive biconvex lens element;
said fourth lens unit comprises a negative biconcave lens element.

9. A zoom finder comprising in order from an object side, a stationary first lens unit having negative refractive power, a movable second lens unit having negative refractive power, a movable third lens unit having positive refractive power and a stationary fourth lens unit having negative refractive power, said second and said third units being moveable for zooming so that a space between said second lens unit and said third lens unit varies for zooming, wherein during zooming the image plane remains substantially constant, thus requiring no accommodation from the eye.

10. A zoom finder according to claim 9 wherein:
said first lens unit comprises a negative lens element with a stronger curvature oriented towards a pupil position;
said second lens unit comprises a negative meniscus lens element with a concave surface oriented toward the first lens unit;
said third lens unit comprises a positive biconvex lens element;
said fourth lens unit comprises a negative biconcave lens element.

11. A zoom finder according to claim 9 comprising the following design parameters

|  | Clear Apertures | | | | Material | |
|---|---|---|---|---|---|---|
| Surface | Top-Bottom | Side-Side | Radius | Thickness | N | V |
| S1 | 7.76 | 12.30 | −463.009 | 1.500 | 492 | 574 |
| S2 | 6.77 | 10.28 | ASPHERE | A | | |
| S3 | 4.19 | 6.96 | −7.58810 | 1.700 | 535 | 405 |
| S4 | 4.58 | 7.82 | ASPHERE | B | | |
| S5 | 5.85 | 10.50 | 11.8290 | 4.670 | 492 | 574 |
| S6 | 5.67 | 10.25 | ASPHERE | C | | |
| S7 | 3.10 | 3.99 | −38.1935 | 1.200 | 535 | 405 |
| S8 | 3.00 | 3.61 | 44.2280 | | | |

FINDER LENGTH = 32.000

ASPHERIC EQUATION:

$$SAG = X = \frac{CY^2}{1 + \sqrt{1 - (k + 1)C^2Y^2}} + DY^4 + EY^6 + FY^8 + GY^{10} + HY^{12}$$

| SURFACE S2 | C = .13752171 | F = .3713080E-06 |
| | k = −.95070186 | G = −.6640295E-08 |
| | D = −.7956792E-04 | H = .4424682E-10 |
| | E = −.9262375E-05 | |
| SURFACE S4 | C = −.02107171 | F = −.4358199E-06 |
| | k = −144.581545 | G = .8890752E-08 |
| | D = −.2195330E-03 | H = −.6878591E-10 |
| | E = .5259288E-05 | |
| SURFACE S6 | C = −.07742708 | F = −.1173125E-07 |
| | k = −4.31725012 | G = −.1292248E-09 |
| | D = .3499638E-04 | H = .1088147E-11 |
| | E = .2616992E-05 | |

| | AIR SPACE: | | |
|---|---|---|---|
| MAG. | A | B | C |
| .275 | 16.614 | 5.816 | .500 |
| .382 | 10.836 | 5.499 | 6.595 |
| .529 | 4.434 | 5.949 | 12.547. |

* * * * *